UNITED STATES PATENT OFFICE.

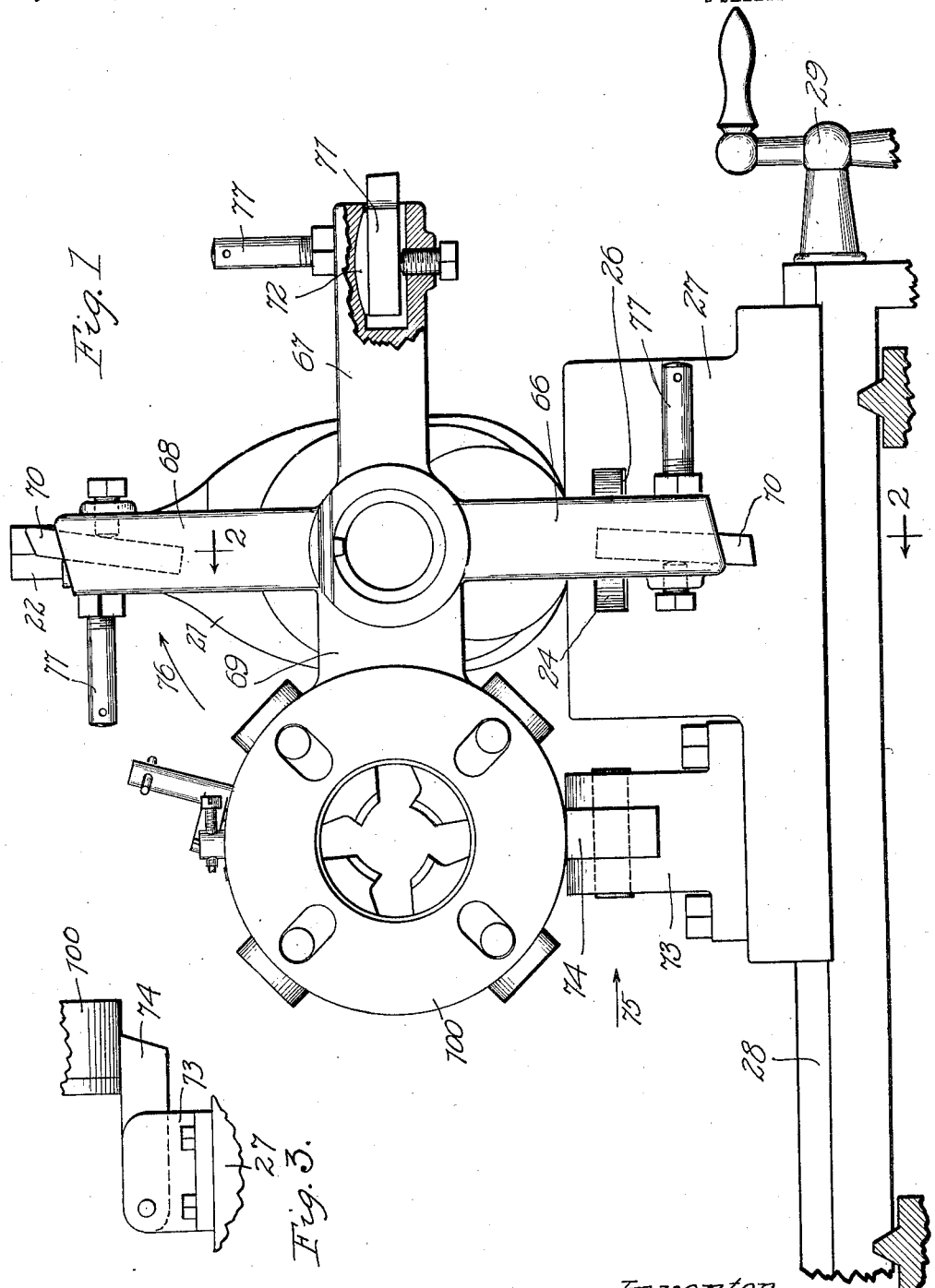

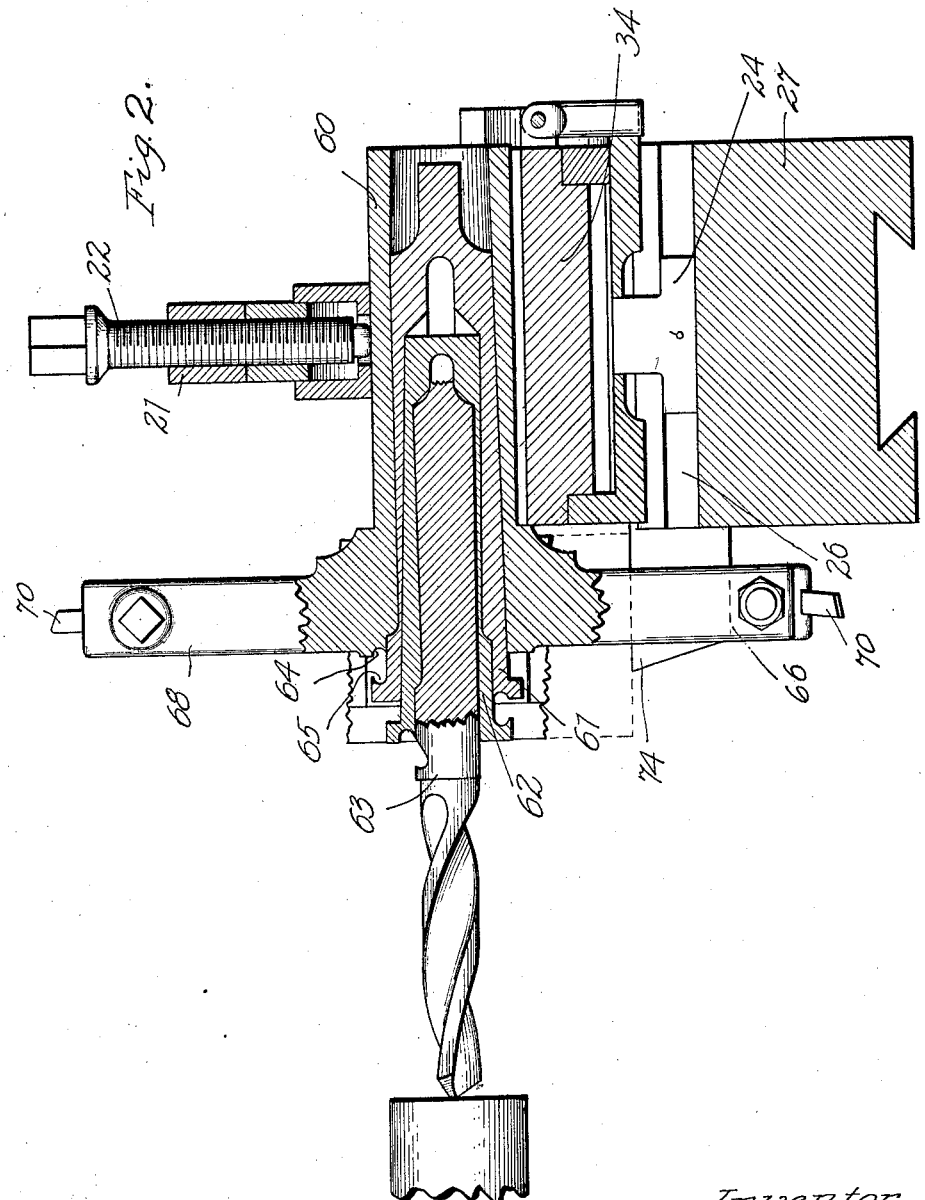

JOHN M. PALMER, OF CHICAGO, ILLINOIS, ASSIGNOR TO UNIVERSAL TOOL COMPANY, OF CHICAGO, ILLINOIS, A CORPORATION OF ILLINOIS.

LATHE ATTACHMENT.

1,030,323.      Specification of Letters Patent.      Patented June 25, 1912.

Application filed July 17, 1907. Serial No. 384,167.

*To all whom it may concern:*

Be it known that I, JOHN M. PALMER, citizen of the United States, residing at Chicago, in the county of Cook and State of Illinois, have invented a certain new and useful Improvement in Lathe Attachments, of which the following is a full, clear, concise, and exact description, reference being had to the accompanying drawings, forming a part of this specification.

My invention relates to lathes and more particularly to turret appliances for use on engine lathes.

The features of my invention are illustrated in the accompanying drawings in which—

Figure 1 illustrates in front elevation a lathe carriage in which are mounted the turret head of my invention; Fig. 2 is a cross-sectional view taken on line 2, 2 of Fig. 1, certain parts being broken away, however, to more thoroughly reveal the details of construction; Fig. 3 is a detail view, which will be referred to.

The carriage 28 is illustrated in Fig. 1 as running upon the guide-ways of a lathe, this carriage having the usual rail which takes into a dove-tail slot in the slide rest 27. The crank 29 is provided for securing movement of the rest relative to the carriage. The slide rest 27 has a T-slot 26 in which is disposed the head 24 of a tool post 21. This tool post is provided with a sizing device 34 which does not form a part of this case, and is not, therefore, described in detail. Suffice it to say, that the set screw 22 of the tool post is arranged to firmly hold the spindle 60 of the turret head to be described, in place.

Coming now to the turret head it will be seen from an inspection more particularly of Figs. 1 and 2 that the turret head comprises four arms extending from the spindle 60 which preferably is of $2\frac{1}{8}$ inches diameter to correspond with a standard boring tool which can be held in the post. By tightening the clamping screw 22, this spindle may be clamped firmly in the tool post. The spindle may be provided as shown in Fig. 2, with a tapered hole, preferably corresponding with the standard taper which is used in drill press spindles. Fig. 2 shows two sleeves 61 and 62 fitted, one inside the other and both into the tapered socket of the spindle 60, and the twist drill 63 is inserted in the smaller sleeve. Each of these sleeves is provided with a depressed key and key-way, corresponding with the disclosure of my copending application, Serial No. 387,604 filed August 8, 1907. So also the forward end of the spindle is provided with a groove at 64, this groove registering with the separating groove 65 which is cut through the flanged end of the sleeve 61. The other sleeve and the drill are equipped with similar flanges and separating ledges, all corresponding with the invention set forth in the application above mentioned. The spindle 60 is provided at its forward end with the four tool supporting arms 66, 67, 68 and 69. The arms 66 and 68, as here shown, are provided for the reception of roughing, finishing or shoulder tools 70. The arm 67 is provided with a cutting-off tool 71, this cutting off tool being adjustable upon the crescent-shaped shoe 72 in a manner which will be well understood by those skilled in the art. The arm 69 supports a die stock 100 having adjustable chasers.

To the lathe rest is bolted a standard 73 in which there is pivotally mounted a supporting lever 74. Fig. 3 is an elevation of this detent taken in the direction of the arrow 75, as shown on Fig. 1. Fig. 3 also indicates that while the lever 74 may be thrown upward in order that the arms of the turret head may be cleared, it cannot be forced below the position shown in Fig. 1. In working, therefore, the various arms of the turret head are brought down into position upon the detent formed by the projecting end of the lever 74, and this stiffens and supports the tools in position for work. Thus, for example, a piece of stock having been chucked in the lathe head is subjected to a roughing cut by the tool in the arm 66. The roughing cut having been finished, the turret head is rotated in the direction of the arrow 76 until the finishing tool supported in the arm 68 is brought into position for work. After completing the finishing cut, the head may be again rotated in the direction of the arrow 76, each rotation taking place after loosening the clamping screw 22. This rotation is continued until the die stock is brought into position, the lateral adjustment of this tool being effected by means of the crank 29. The work may then be threaded, after which the die stock will be swung out of operative position, thus bringing the cutting-off tool into play to cut the work off, when a new series of operations may be commenced. The screw threaded studs 77 which project from certain of the arms serve as feet which rest upon the detent lever 74 to support the tools while performing their work. This turret head is very cheap to manufacture and to adjust to engine lathes and serves to transform an engine lathe into a lathe having many of the advantages of special machinery. The tools carried in the turret head can easily and quickly be adjusted to position in which to bring the work to finished size. For this purpose it is only necessary for the lathe hand to learn the number of turns of the crank 29 which controls the feed screw, to be given to bring each of the tools to position. The exact setting of each tool can be determined from marks upon the crank 29 and the apron of the carriage, or by the marks which are frequently milled upon the feed screws of modern lathes. By commencing a series of operations with one of these turret heads, then removing it and substituting another in which the tools have already been set, an almost indefinite series of operations can be carried on without the need of setting a separate tool for each operation. The operation of this turret head is advantageously simple. In order to swing the various tools into place it is necessary only to loosen the clamping screw 22, then to turn the turret head in the tool post until the proper arm has been brought into horizontal position, when a slight backward movement of the turret head will bring the tool against the detent lever 74, where it will be firmly supported in position while performing the required work.

While I have herein shown and described the preferred form of my invention, it will, of course, occur to those skilled in the art that various changes may be made without departing from the spirit of my invention. I do not, therefore, wish to be limited to the precise construction herein shown.

What I claim as my invention is—

1. In combination, a lathe carriage, a tool post, a turret head carrying a plurality of lathe tools and having a spindle substantially parallel with the shears of the lathe and rotatably mounted in said tool post, and a latch mounted on said lathe carriage, said latch permitting the rotation of the turret head in one direction but supporting and engaging the turret head to prevent rotation in the reverse direction, substantially as described.

2. In combination a lathe carriage, a tool post, a turret head carrying a plurality of salient arms for the reception of lathe tools and having a spindle substantially parallel with the shears of the lathe and rotatably mounted in said tool post, and a latch mounted on said lathe carriage, said latch being movable to permit the rotation of the turret head in one direction but supporting and engaging said arms to prevent rotation in the reverse direction, substantially as described.

3. In a lathe attachment, a turret head for carrying a plurality of lathe tools, and a substantially concentric shank extending therefrom, said head and shank having a tool receiving socket therein.

In witness whereof, I hereunto subscribe my name this 9th day of July A. D., 1907.

JOHN M. PALMER.

Witnesses:
LEONARD W. NOVANDER,
CHARLES J. SCHMIDT.

Copies of this patent may be obtained for five cents each, by addressing the "Commissioner of Patents, Washington, D. C."